W. K. KIGHT.
LENS FOR EYEGLASSES.
APPLICATION FILED JAN. 16, 1909.

1,022,789.

Patented Apr. 9, 1912.

Witnesses
A. J. McCauley
Lenore Clark

Inventor:
William K. Kight
by J. R. Cornwall
Att'y.

UNITED STATES PATENT OFFICE.

WILLIAM K. KIGHT, OF DEXTER, MISSOURI.

LENS FOR EYEGLASSES.

1,022,789.  Specification of Letters Patent.  Patented Apr. 9, 1912.

Application filed January 16, 1909. Serial No. 472,613.

*To all whom it may concern:*

Be it known that I, WILLIAM K. KIGHT, a citizen of the United States, residing at Dexter, Stoddard county, Missouri, have invented a certain new and useful Improvement in Lenses for Eyeglasses, of which the following is a full, clear, and exact description, such as will enable others skilled in the art to which it appertains to make and use the same, reference being had to the accompanying drawings, forming part of this specification, in which—

Figure 1:
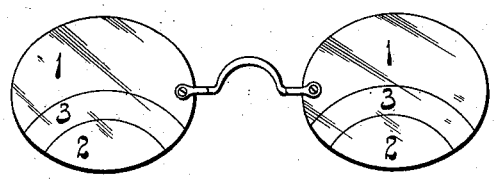
Figure 2:
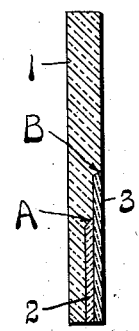

Figure 1 is an elevational view of a pair of eye glasses showing my improved lenses in position therein. Fig. 2 is a sectional view through one of the lenses.

This invention relates to a new and useful improvement in lenses for eye glasses, being designed particularly as an improvement upon tri-focal lenses illustrated in my Patent No. 896,393, dated August 18th, 1908.

The object of my present invention is to provide the main lens with beveled steps or shoulders instead of the abrupt angular shoulders illustrated in my aforesaid patent, for the purpose of making the lines of demarcation between the lenses so fine that they will not interfere with the vision of the wearer.

In the drawings, 1 indicates the main lens provided with beveled shoulders A and B; 2 is the reading lens, so called, the upper edge of which is beveled and fitting against shoulder A so as to be flush therewith.

3 indicates the lens for the intermediate vision, the upper edge of which is beveled so as to fit snugly against the beveled shoulder B. This lens 3 is positioned immediately over the lens 2, and the outer face of said lens 3 is flush with the corresponding face of the main lens 1. Lenses 2 and 3 are cemented or fused in position in a manner well known in the art. It is, of course, understood that neither the lenses 2 or 3 can be used separately as reading or intermediate lenses, they performing these respective functions in combination with each other and the main lens 1.

It will be noted that the joints between the lenses 2 and 3 and the main lens 1, are inclined or beveled, and the lines of inclination of these joints are approximately in the same plane with the lines of vision when the wearer of the eyeglasses is reading or walking, and for this reason the lines of demarcation between the various lenses are so fine as that they do not interfere with the vision of the wearer, which is the case where abrupt angular shoulders are formed between the edges of the lenses 2 and 3 and 1, as is the case in my patent herein referred to.

Having thus described my invention what I claim is:—

As a new article of manufacture, a tri-focal lens for eyeglasses comprising a main lens for long distance vision provided with two depressions in the lower portion of its inner face, one depression being smaller than and within the other, there being concentric beveled shoulders formed at the upper edges of said depressions, a lens for short distance or reading vision arranged in the smaller one of the depressions and provided with a beveled edge corresponding with and fitting against the beveled shoulder of the smaller depression, and a lens for intermediate vision arranged over the short distance lens and occupying the larger one of the depressions, the edge of which intermediate vision lens is beveled to correspond with and fit against the beveled shoulder of the larger depression and the beveled joints between the supplemental lenses and the main lens being inclined to correspond with the lines of vision of the wearer of the lenses whereby the lines of demarcation between the supplemental lenses and the main lens are reduced to a minimum.

In testimony whereof I hereunto affix my signature in the presence of two witnesses, this 7th day of Jan'y 1909.

WILLIAM K. KIGHT.

Witnesses:
J. F. BLANKENSHIP,
J. WILLIAM COOK.